United States Patent [19]

Kim

[11] Patent Number: 5,715,410
[45] Date of Patent: Feb. 3, 1998

[54] INTERFACE CIRCUIT FOR SUPPORTING PCMCIA CARDS IN AN X-TERMINAL

[75] Inventor: Bang-Gil Kim, Seoul, Rep. of Korea

[73] Assignee: Samsung Electronics Co., Ltd., Suwon, Rep. of Korea

[21] Appl. No.: 512,761

[22] Filed: Aug. 9, 1995

[30] Foreign Application Priority Data

Dec. 12, 1994 [KR] Rep. of Korea .................. 94-33770

[51] Int. Cl.$^6$ ...................................... G06F 13/00
[52] U.S. Cl. ....................... 395/309; 395/282; 395/822
[58] Field of Search .................... 395/821–822, 395/280–282, 550, 880, 309

[56] References Cited

U.S. PATENT DOCUMENTS

| | | | |
|---|---|---|---|
| 4,507,732 | 3/1985 | Catiller et al. | 395/879 |
| 4,530,069 | 7/1985 | Desrochers | 395/822 |
| 5,487,161 | 1/1996 | Koenck et al. | 395/442 |
| 5,488,575 | 1/1996 | Danielson et al. | 364/707 |
| 5,500,517 | 3/1996 | Cagliostro | 235/486 |
| 5,515,303 | 5/1996 | Cargin, Jr. et al. | 364/708.1 |

*Primary Examiner*—Ayaz R. Sheikh
*Assistant Examiner*—Sumati Lefkowitz
*Attorney, Agent, or Firm*—Cushman Darby & Cushman, IP Group of Pillsbury Madison & Sutro LLP

[57] ABSTRACT

By providing various functions in an X-terminal, the PCMCIA card controlling interface circuit supports various I/O functions through the same PCMCIA card that is used in personal computers. It also has more convenient and varied software support by using the PCMCIA memory card. In order to achieve this object, the PCMCIA card controlling interface circuit includes a clock signal generator, a PCMCIA card, a main processor, a bus interface, and a PCMCIA card controller. The clock-signal generator outputs a CLOCK signal. The PCMCIA card includes a number of memory card and I/O cards. The main processor outputs an address, a control signal and a driving signal to read and write to the PCMCIA card in accordance with a clock signal from said clock-signal generator. The bus interface is connected with an output unit of the main processor, and outputs a bus operating signal according to a driving signal from the main processor, and outputs a corresponding command to process an applied address and an applied control signal, and then outputs a stop signal. The PCMCIA card controlling interface therefore controls data transmission, data reception, and a control-signal. The PCMCIA card controller inputs an address from the main processor in accordance with the bus-operating-signal from the bus interface, performs a Read/Write operation of the PCMCIA-card's data according to the applied command, and stops the present operation in accordance with the applied stop signal.

3 Claims, 2 Drawing Sheets

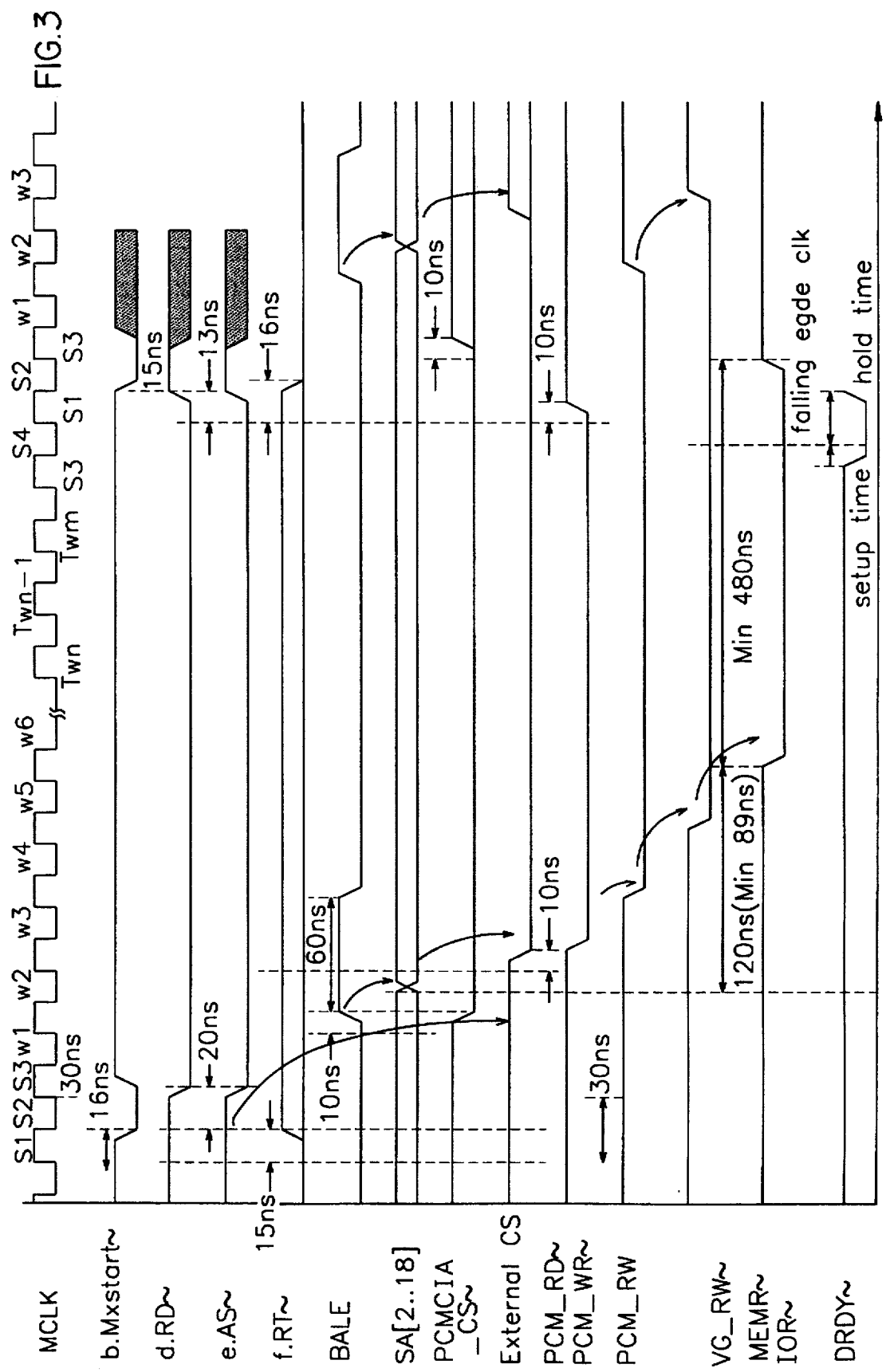

INTERFACE CIRCUIT FOR SUPPORTING PCMCIA CARDS IN AN X-TERMINAL

BACKGROUND OF THE INVENTION

(1) Field of Invention

The present invention relates to an interface circuit for supporting a PCMCIA (Personal Computer Memory Card International Association) card in an X-terminal. More particularly, this invention relates to an interface circuit that connects a main processor with a PCMCIA card controller in an X-terminal. In accordance with the invention, PCMCIA cards, which are conventionally supported by personal computers, can be supported by an X-terminal.

(2) Description of the Prior Art

Portable computers, such as notebooks, Palmtops, or Pen-based personal computers (PCs) miniaturize the structural elements of the computer to make carrying more convenient.

Following the current trend of miniaturizing structural elements, a new standard for the structural elements which are used in the portable computer is currently being established. This new standard for structural elements coming into the market is now being produced on a commercial scale.

The PCMCIA, in accordance with the current trend, has established a standard for new PCMCIA cards with extended functions and which is connected to an outside system through a connector on the portable computer.

According to the new standard, new PCMCIA cards and a card interface controller for driving the PCMCIA cards are being manufactured for applications in portable computers. There are extended memory cards, MODEM (Modulator and Demodulator) cards, LAN (Local Area Network) cards, and HDD (Hard Disk Driver) cards incorporated into various PCMCIA cards.

An X-terminal uses X-windows on a workstation, requires more varied input/output (I/O) functions, and a more convenient and flexible use of memory than PCs. However, many of the features available with use of PCMCIA cards are not currently offered on X-terminals.

SUMMARY OF THE INVENTION

It is an object of the present invention to provide a PCMCIA card controlling interface circuit for providing various functions to an X-terminal. The present invention supports a number of I/O functions, through the PCMCIA cards, which are typically used in personal computers, and which have a more convenient and varied support of software.

In order to achieve this object, the present invention includes a clock-signal generator, a plurality of PCMCIA cards, a main processor, a bus interface, and a PCMCIA card controller.

The clock-signal generator outputs a clock signal. The PCMCIA cards includes at least a memory card and I/O card. The main processor outputs an address, a control signal, and a driving signal to read and to write to the PCMCIA cards in accordance with a clock signal from the clock-signal generator.

The bus interface is connected with an output unit of the main processor and outputs a bus-operating signal according to a driving signal from the main processor, a command corresponding to both the address and the control signal which are applied from the main processor, and a stop signal for finishing a data read/write operation. The bus interface thus controls data transmission, data reception, and the control-signal.

The PCMCIA card controller inputs an address from the main processor according to the bus-operating signal from said bus interface, performs a Read/Write operation of the PCMCIA-card's data according to an applied command, and completes the operation according to the applied stop signal.

BRIEF DESCRIPTION OF THE DRAWINGS

FIG. 3 is a timing diagram of a control-signal of a PCMCIA card which controls the interface circuit in an X-terminal in accordance with a preferred embodiment of the present invention.

As shown in FIG. 1, the PCMCIA card controlling interface circuit includes: a main processor 10, a PCMCIA card controller 30, a bus interface 20 for controlling both a control-signal and a data operation between said main processor 10 and the PCMCIA card controller 30; a clock-signal generator 40 for generating a clock-signal for operating the main processor 10, the PCMCIA card controller 30, and the bus interface 20; a divider 41 for dividing a frequency of a signal outputted from the clock signal generator 40 into N units; and a PCMCIA card connector 50 which is used for mounting several PCMCIA cards on one another.

Figure 1:
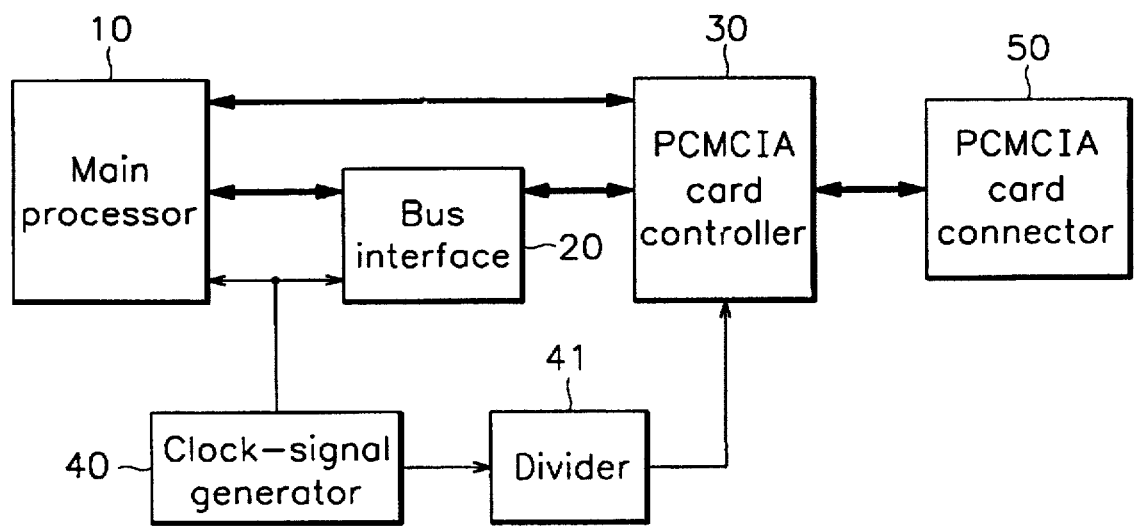
FIG. 1 is a block diagram showing the connection between the main processor and the PCMCIA card controller in an X-terminal in accordance with a preferred embodiment of the present invention.
Figure 2:
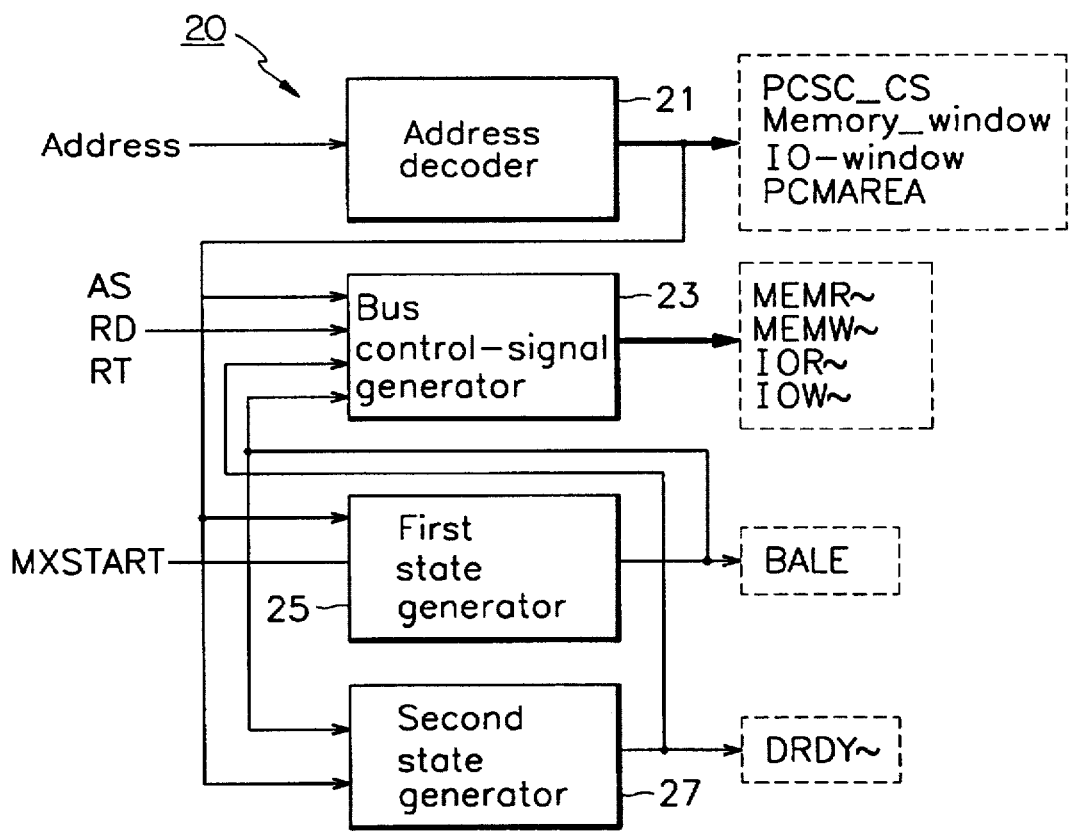
FIG. 2 is an internal diagram of a bus interface circuit for supporting PCMCIA cards in an X-terminal in accordance with a preferred embodiment of the present invention.

Shown in FIG. 2 is a more detailed diagram of the bus interface 20 in accordance with a preferred embodiment of the present invention. The bus interface is comprised of an address decoder 21, a bus-control-signal generator 23, a first state-generator 25, and a second state-generator 27.

The address-decoder 21 outputs a chip-selection (PCSC_CS) signal for reading and writing to a register of the PCMCIA card controller 30 by interpreting an address from the main processor 10, a memory_window signal for reading and writing to a memory-card, and an I/O Window signal which is used in an I/O card.

According to a command from the main processor 10, the bus-control-signal generator 23, which is connected with the output unit of said address decoder 21, outputs a command (MEMR, MEMW) for accessing the memory-card, and another command (IOR, IOW) for accessing the I/O card and the PCMCIA card controller 30.

A memory-transaction-start (MXSTART) signal from the main processor 10, causes the first state generator 25, which is connected with the output unit of said address-decoder 21, to output a BALE (Bus Address Latch Enable) signal to operate the PCMCIA card controller 30.

The second state-generator 27 is connected with the address-decoder 21 and outputs a DRDY (Data Ready) signal for stopping the bus interface 20.

In the preferred embodiment of the present invention, the main processor 10 is an LR33120 processor, and supports an 8 bit operation by connecting the lower 8 bits of the 32 bits of the main processor 10 to the PCMCIA card controller 30 because the PCMCIA card can operate using either 8 or 16 bits and the main processor 10 can operate using 32 bits.

According to the preferred embodiment of the present invention, the PCMCIA card controlling interface circuit operates according to the following description.

If a user mounts several PCMCIA cards on the PCMCIA card connector, the PCMCIA card controller 30 will operate as shown in FIG. 3. A clock-signal generator 40 outputs a clock signal MCLK, and both the main processor 10 and the bus interface 20 input the clock signal MCLK. The divider 41 sets up a time period which is longer than that of the clock signal MCLK by N times. When the clock signal MCLK is inputted, the divider 41 synchronizes and divides the signal according to 1/N frequency of the clock signal MCLK inputted, thereby outputting the divided signal to the PCMCIA card controller 30. In brief, the PCMCIA card controller 30 inputs the clock signal MCLK which is divided into N units by a divider 41.

In a single cycle of the clock signal MCLK, the main processor 10 outputs the low level memory-transaction-start signal MXSTART to the bus interface 20 for reading and writing to the PCMCIA-memory-card which is mounted on the PCMCIA card connector 50.

As shown in FIG. 3, the main processor 10 outputs the MXSTART signal for reading and writing to the memory card, and then sends out an address strobe AS signal for assigning a required memory region, a read strobe RD signal and a read transaction RT signal both of them read a memory region.

If a low-level MXSTART signal outputted to the bus interface 20 is input into the first state-generator 25, the first state-generator 25 will activate the BALE signal for operating the PCMCIA card controller 30 in the S2 and S3 states by using a high voltage level BALE signal. The operation states are given as follows:

| state | IDLE: | IF(MXSTART) | THEN S1 ELSE IDLE |
|---|---|---|---|
| state | S1: | GOTO S2 | |
| state | S2: | IF(MXSTART) | THEN S1 ELSE S3 |
| state | S3: | IF(MXSTART) | THEN S1 ELSE IDLE |

The address decoder 21 of the bus interface 20 interprets the address from the main processor 10, and then outputs a chip-selection PCSC_CS address for reading and writing a register of the PCMCIA card controller 30, a memory_window address for reading and writing the memory-card, and an IO_window address which is used in the I/O card. These addresses are then output to the PCMCIA card controller 30, as shown in FIG. 2. The address decoder 21 can access a memory card of maximum size 64 MB by using the memory_window address using from 4 MB to 16 MB.

Also, according to the control-signals (AS,RD,RT) from the main processor 10, the bus control-signal generator 23 outputs commands (MEMR,MEMW), which are used to access the memory card. A command IOR for reading the memory and a command IOW for writing the memory are used to access both the I/O card and the PCMCIA card controller 30. According to the system address output by the address decoder 21, the PCMCIA card controller 30 performs a Read/Write operation on the memory through a control-signal generated by the bus control-signal generator 23 with a latch of the address from the main processor 10 and in accordance with the high-level BALE signal from the first state-generator 25.

According to the timing of signals shown in FIG. 3, the PCMCIA card which is mounted on the PCMCIA card connector 50 of the PCMCIA card controller 30 is read and written to.

According to the following description of the various states, the second state-generator 27 generates the DRDY signal for stopping the operation that is being processed, and the second state-generator 27 controls a wait time of the main processor 10. Therefore, the second state generator 27 is able to access the PCMCIA-card. The aforementioned description of the states is as follows:

| state | IDLE: | IF(BALE) | THEN S1 ELSE IDLE |
|---|---|---|---|
| state | S1: | GOTO S2 | |
| state | S2: | IF(BALE) | THEN S3 ELSE IDLE |
| state | S3: | IF(BALE) | THEN S4 ELSE IDLE |
| state | Sn: | IF(BALE) | THEN Sn + 1 ELSE IDLE |
| state | Sm: | IF(BALE) | THEN Sm + 1 ELSE IDLE |
| state | Sm + 1: | GOTO IDLE | |

The main processor 10 samples the DRDY signal which is output from said second state-generator 27 at a falling edge of a main clock signal from the clock-signal generator 40, the main processor 10 operates continuously if the sampled DRDY signal is high, but if the sampled DRDY signal is low, the operation of the main processor 10 is stopped.

The PCMCIA card controller 30 can control the timing in accordance with operations of both the memory-card and the I/O card. As shown in the state-diagram, when the PCMCIA card controller 30 reads or writes to the PCMCIA memory card, it halts the memory cycle by accepting the DRDY signal in the state Sn. When the PCMCIA card controller 30 reads or writes to the register of both the I/O card and the PCMCIA card controller, it completes the current operation in the state Sm.

The state Sm, Sn can be controlled in accordance with a clock speed of the main processor 10. The state Sn must be less than the state Sm.

The accessing speed of the PCMCIA memory card should be from 200 ns to 250 ns against that of a 33 MHz system which has the processing speed of 30 ns per clock cycle. Accordingly, the PCMCIA memory card has a timing margin when the Sn state is repeated by a minimum 9 or 10 times, namely, n of the state Sn should be 9 or 10. Also, since the Sm is varied in accordance with the I/O card, the timing can be controlled.

According to the BALE signal from the bus interface 20, the PCMCIA card controller 30 reads or writes both the memory card and the I/O card installed on the PCMCIA card connector 50, and then the PCMCIA card controller 30 halts the operations through the DRDY signal.

As described above, the present invention can provide a PCMCIA card controlling interface circuit for providing various functions to an X-terminal. The present invention supports various I/O functions that are used in personal computers through PCMCIA cards, and that have more convenient and varied software support.

What is claimed is:

1. An interface circuit for supporting PCMCIA cards in an X-terminal, comprising:

at least one PCMCIA card, said PCMCIA card being a PCMCIA memory card or a PCMCIA I/O card;
　　a clock signal generator that outputs a clock signal;
　　a main processor that outputs an address, a control signal, and a driving signal for reading and writing said PCMCIA card in accordance with said clock signal from said clock signal generator;

a bus interface electrically connected with said main processor that outputs a bus operating signal in accordance with said driving signal from said main processor, outputs a command corresponding to said address and said control signal received from said main processor, and outputs a stop signal, thereby controlling data transmission from, and data reception by said main processor, said main processor and said PCMCIA card having different data access speeds, said bus interface outputting said bus operating signal in a first state, and outputting said stop signal in a second state, said bus interface controlling said first and second states in accordance with said different data access speeds, said bus interface including:

an address decoder having an output unit for outputting a chip-selection signal which reads and writes a register of said PCMCIA card controller by interpreting said address from said main processor, said address decoder being adapted to output a memory window signal for reading and writing to said PCMCIA card when it is said PCMCIA memory card, and to output an I/O window signal to said PCMCIA card when it is said PCMCIA I/O card;

a first state generator electrically connected with said output unit of said address decoder, said first state generator outputting a driving signal to operate said PCMCIA card controller during said first state according to a memory transaction start signal from said main processor; and a second state generator electrically connected with said output unit of said address decoder, said second state generator outputting a Data Ready signal during said second state for stopping said data transmission or said data reception operation of said PCMCIA card controller; and a PCMCIA card controller that inputs said address from said main processor in accordance with said bus operating signal from said bus interface, performs a Read/Write operation on said PCMCIA card in accordance with said command output from said bus interface, and stops a data reception or a data transmission operation based on said stop signal output from said bus interface.

2. The interface circuit as in claim 1, wherein said main processor has a faster access speed than said PCMCIA card, and wherein said bus interface controls said first and second states such that they provide a timing margin between said different data access speeds of said main processor and said PCMCIA card.

3. An interface circuit for supporting PCMCIA cards in an X-terminal, comprising:

at least one PCMCIA card, said PCMCIA card being a PCMCIA memory card or a PCMCIA I/O card;

a clock signal generator that outputs a clock signal;

a main processor that outputs an address, a control signal, and a driving signal for reading and writing said PCMCIA card in accordance with said clock signal from said clock signal generator;

a bus interface electrically connected with said main processor that outputs a bus operating signal in accordance with said driving signal from said main processor, outputs a command corresponding to said address and said control signal received from said main processor, and outputs a stop signal, thereby controlling a data transmission from, and data reception by said main processor, said bus interface comprising:

an address decoder having an output unit for outputting a chip-selection signal which reads and writes a register of said PCMCIA card controller by interpreting said address from said main processor, said address decoder being adapted to output a memory window signal for reading and writing to said PCMCIA card when it is said PCMCIA memory card, and to output an I/O window signal to said PCMCIA card when it is said PCMCIA I/O card, a bus control signal generator electrically connected with said output unit of said address decoder, said bus control signal generating, in accordance with said control signal from said main processor, a first command for accessing said PCMCIA card when it is said PCMCIA memory card, and a second command for accessing said PCMCIA card when it is said PCMCIA I/O card, a first state generator electrically connected with said output unit of said address decoder, said first state generator outputting a driving signal to operate said PCMCIA card controller during said first state according to a memory transaction start signal from said main processor, and a second state generator electrically connected with said output unit of said address decoder, said second state generator outputting a Data Ready signal during said second state for stopping said data transmission or said data reception operation of said PCMCIA card controller;

a PCMCIA card controller that inputs said address from said main processor in accordance with said bus operating signal from said bus interface, performs a Read/Write operation on said PCMCIA card in accordance with said command output from said bus interface, and stops a data reception or a data transmission operation based on said stop signal output from said bus interface.

* * * * *